Dec. 19, 1961   F. A. JOHNSON   3,013,631
SEPARATION OF CARBON FLUORIDES FROM NITROGEN FLUORIDES
Filed May 10, 1960
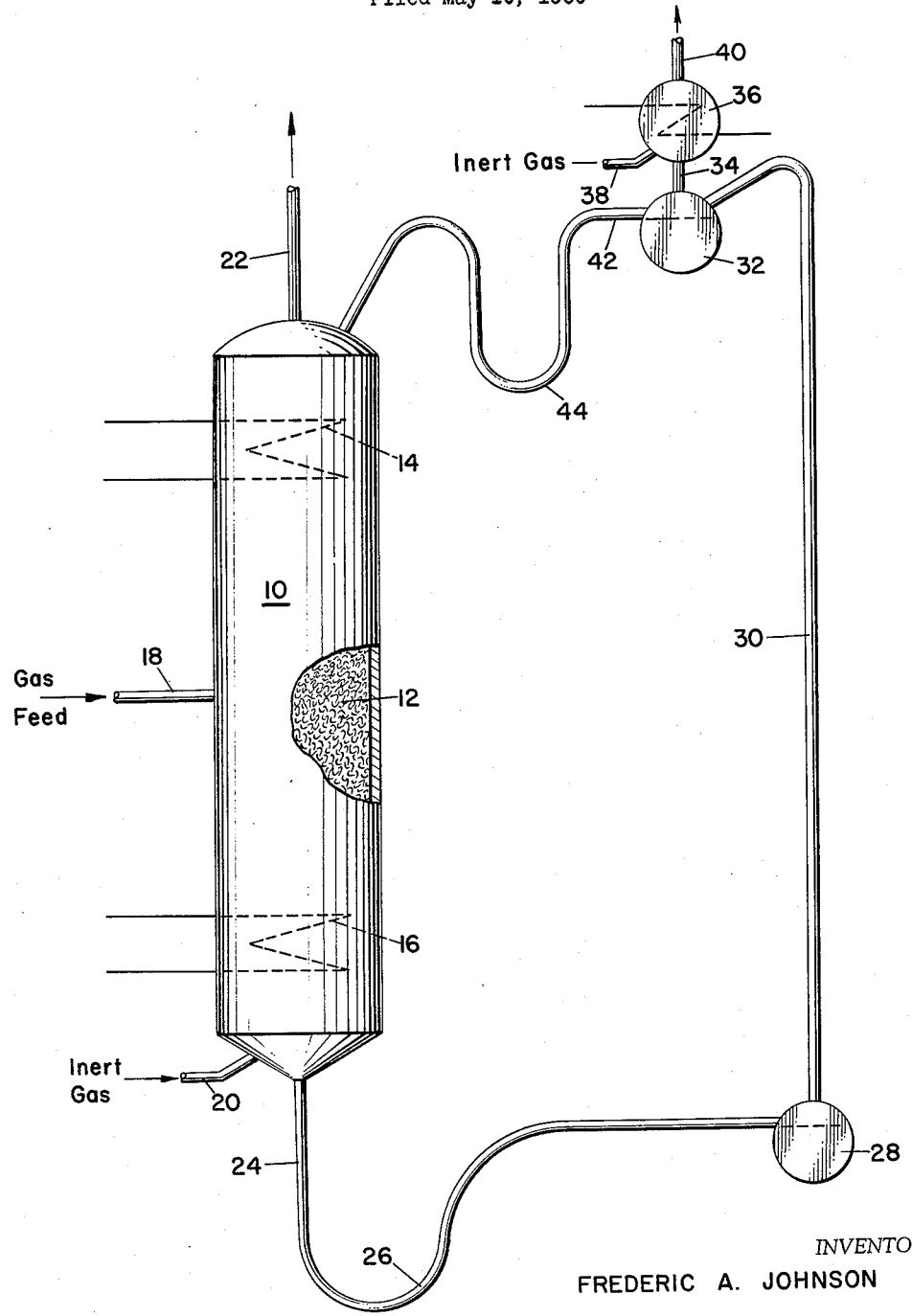
INVENTOR
FREDERIC A. JOHNSON
BY
ATTORNEY 3,013,631
SEPARATION OF CARBON FLUORIDES
FROM NITROGEN FLUORIDES
Frederic A. Johnson, Huntsville, Ala., assignor to Rohm & Haas Company, Philadelphia, Pa., a corporation of Delaware
Filed May 10, 1960, Ser. No. 28,089
8 Claims. (Cl. 183—115)

This invention concerns a process for the separation of the carbon fluorides and the nitrogen fluorides from the mixture of fluorides which results from the reaction of nitrogen trifluoride ($NF_3$) with carbon in a process for the production of tetrafluorohydrazine ($N_2F_4$).

When $NF_3$ is reacted with carbon at elevated temperatures, the mixture which results, containing the desired product, $N_2F_4$, also contains varying amounts of carbon tetrafluoride ($CF_4$), hexafluoroethane ($C_2F_6$) and unreacted $NF_3$. It is desired to separate the $N_2F_4$ in a high degree of purity and recover the $NF_3$ for recycle. However, these four major components have the following boiling points:

|  | °C. |
|---|---|
| $NF_3$ | −129 |
| $CF_4$ | −128 |
| $N_2F_4$ | −73 |
| $C_2F_6$ | −76 |

Thus, the separation of $NF_3$ or $N_2F_4$ from $CF_4$ or $C_2F_6$ by distillation or fractionation methods is practically impossible. Furthermore, methods which depend on the removal of the impurities by preferential reaction of the impurities fail because the reactivities of the desired products, $N_2F_4$ and $NF_3$, are appreciably greater than the reactivities of the impurities $CF_4$ and $C_2F_6$.

There is no process shown in the prior art for the separation of this complex mixture, and since it is desired to obtain $N_2F_4$ in as high a degree of purity as possible, a satisfactory purification process has long been sought.

$N_2F_4$ reacts with chlorine when the mixture is irradiated with ultraviolet reagent to produce chlorodifluoroamine, $ClNF_2$. $ClNF_2$ reacts with divinyl mercury to produce vinyl chloride. The uses of this monomer are well-known.

$NF_3$ is of value as the raw material for the manufacture of $N_2F_4$ by reacting the $NF_3$ with arsenic, bismuth or carbon at elevated temperatures. Details of this process appear in JACS, 80, 5004 (1958).

Unexpectedly, it has been found that the $N_2F_4$ fraction of the mixture of $N_2F_4$, $NF_3$, $CF_4$ and $C_2F_6$ can be extracted if the gas mixture is contacted with a solvent as hereinafter described under the conditions as also set forth hereinafter. The calculated "ideal" solubilities at 25° C. of the four compounds are:

|  | moles/mole-atmos. |
|---|---|
| $CF_4$ | $4.8 \times 10^{-3}$ |
| $NF_3$ | $6.2 \times 10^{-3}$ |
| $C_2F_6$ | $3.8 \times 10^{-2}$ |
| $N_2F_4$ | $7.4 \times 10^{-2}$ |

The ratios of pairs of these numbers are useful means of estimating the case of separation of the members of the pair. The ratios $NF_3/CF_4 = 1.29$ and $N_2F_4/C_2F_6 = 1.96$ are in the range where useful separation can be made.

In addition, some real solvents show larger ratios (experimental) than those calculated for "ideal" behavior:

| Solvent: | $\alpha$ ($CF_4/NF_3$) |
|---|---|
| Ideal | 1.29 |
| $HCCl_3$ | 2.26 |

|  | $\alpha$ ($C_2F_6/N_2F_4$) |
|---|---|
| Ideal | 1.96 |
| $HCCl_3$ | 2.07 |
| $CH_3OH$ | 1.24 |
| $C_2Cl_2H_4$ | 2.24 |
| $C_6H_{12}$ | 1.98 |
| $C_6H_6$ | 2.17 |
| $C_6H_5Cl$ | 2.23 |

(The ratio $\alpha$ is "relative volatility" of CF/NF—this number is identical with the "relative solubility" of NF/CF.)

The following is an example of the determination of $\alpha$: A 111.8 cc. STP gas sample of 50% $NF_3$–50% $CF_4$ was exposed to 50 cc. of chloroform. After equilibration, the undissolved gas was removed and analyzed, as was the dissolved gas.

|  |  | Original | Relative conc. in liquid | Relative conc. in gas |
|---|---|---|---|---|
| $NF_3$ | percent | 50.0 | 65.5 | 45.5 |
| $CF_4$ | do | 50.0 | 34.5 | 54.4 |
| Vol | cc | 111.8 | 22.7 | 89.9 |

$$\alpha = \frac{0.655C \times 0.544P}{0.345C \times 0.455P} = 2.26$$

C = concentration in liquid phase.
P = concentration in gas phase.

The invention will be illustrated in connection with the attached drawing to which reference is made.

The process of the present invention is best carried out in a packed column or tower. The solvent is fed into the top of the column and trickles down over the packing. The mixture of gases is fed into the column at a point below the top, preferably about halfway down the column. The solvent must be one in which an appreciable difference exists in the solubilities of the gases to be separated, namely, $N_2F_4$ and the mixture of $NF_3$, $CF_4$ and $C_2F_6$. The same is true of the mixture of $NF_3$ and $CF_4$ from which the recovery of $NF_3$ is desired. The greater the difference in solubilities, the better the separation. Suitable solvents have been listed hereinbefore, but, in general, hydrocarbons and chlorinated hydrocarbons are preferred classes.

More effective separation is obtained if there is a temperance differential between the top of the column and the bottom of the column. Thus, the top can be at a temperature of from about 15° C. to about 30° C. while the bottom can be from about 40° C. to about 60° C. Preferred temperatures for top and bottom are 25° C. and 50° C. respectively.

There is a direct relationship between the solvent flow rate and the gas feed rate, and they must be properly adjusted in order to obtain good separation. Thus, if $F$ = solvent flow in moles per minute,
$S$ = solubility of $N_2F_4$ in the solvent expressed as moles per mole-atmosphere, $G$ = gas feed rate in moles per minute, then
$FS$ = moles per minute $N_2F_4$ in column effluent, and
$V_p$ = vapor pressure in atmospheres of the solvent in the column foot, and for optimum separation $(1-V_p)FS = G \times$ mole percent $N_2F_4$ (in the gas feed), Since the solubility of $N_2F_4$ in the solvent is known or can readily be determined, and since the percent $N_2F_4$ in the influent can be readily determined, fixing F or G automatically fixes the other variable.

In the separation of $NF_3$ from $CF_4$, to be described hereinafter, the same relationship obtains, namely, $(1-V_p)FS = G \times$ mole percent $NF_3$ (in the gas feed)

There is a limitation on the minimum gas flow which can be used. The rate of gas flow must exceed the amount of gas which is soluble in the solvent present in the column.

The rate of gas feed and the rate of solvent feed depends on several factors. Thus these two rates are dependent on the composition of the influent feed, the solvent being used, the temperature of operation, and the degree of purity required of the $N_2F_4$ or $NF_3$ effluent. Thus, using a three foot long, 18 mm. inside diameter column, a gas feed of the composition 23 percent $CF_4$ and 76 percent $NF_3$, the gas feed rate was 9.8 cc. per minute, the solvent, methanol, was fed to the top of the column at a rate of 5 cc. per minute and the gas recovered from the methanol solvent had the composition 4.8 percent $CF_4$ and 95.1 percent $NF_3$. The temperature of the top of the column was 25° C. and the bottom of the column was maintained at 45° C. Typical conditions for the separation of $N_2F_4$ from a mixture consisting of $N_2F_4$, $C_2F_6$, $CF_4$ and $NF_3$ are set forth in detail in the examples.

There is a direct relationship between the length of the column or tower and the degree of purification effected. Since the effect is one of successive equilibrations, the longer the column, the better the separation. A preferred method comprises the use of several columns or towers in which system the solvent effluent from the first tower is degassing by heating and the gas obtained thereby is used as the feed for the second column. When a very high degree of purity is required, several columns will be employed in this fashion in series.

Another embodiment of this invention includes the use of an inert gas as a sweep which is insoluble in the solvent by introducing the gas into the bottom of the column. This inert gas flow increases the rate of removal of the less soluble gases from the column. Typical of such inert gases are helium, argon, nitrogen, etc.

In the separation of $N_2F_4$ from the mixture from the reaction of carbon with $NF_3$, the gaseous effluent from the top of the column contains unreacted $NF_3$, $CF_4$ and $C_2F_6$. Since $NF_3$ boils at −129° C., $CF_4$ at −128° C. and $C_2F_6$ at −76° C., the $C_2F_6$ can be readily removed from the mixture by condensing it in a cold trap. There is left a mixture of $NF_3$ and $CF_4$ which, as in the case of the original mixture, cannot be separated to obtain substantially pure $NF_3$ by fractional distillation or by preferential chemical reaction.

Because of the different solubilities of $NF_3$ and $CF_4$ in a variety of solvents under the reaction conditions as set forth hereinbefore, it is possible to use a similar solvent process for the recovery of substantially pure $NF_3$. In this process, the $NF_3$ remains in the solvent effluent from the bottom of the column and is recovered therefrom by distillation. The $CF_4$ is in the gaseous effluent from the top of the column.

Since the principles involved in the separation of $NF_3$ from a mixture of $NF_3$ and $CF_4$ are the same as those applied in the separation of $N_2F_4$ from a mixture of $N_2F_4$, $NF_3$, $CF_4$ and $C_2F_6$, the same factors are controlling. Thus, differential heating of the column increases the efficiency of separation, as does an inert gas sweep. Multiple columns in series as hereinbefore described also give a very pure product.

In both purification processes, the column is operated with enough solvent therein to form a liquid seal at the bottom of the column. The column can contain more solvent but it is generally not advisable to have more than one quarter to one-third of the column full of solvent.

The solvent effluent from the bottom of the column, which has been degassed, can be recycled to the column for re-use.

The columns or towers can be packed with any of the inert conventional tower packing materials such as glass helices, Raschig rings, etc. The so-called bubble towers can also be used. On a laboratory scale, a three foot long, 18 mm. inside diameter tower packed with glass helices was used.

One variation of the equipment which can be employed for the operation of the process of the present invention is shown in the drawing. The absorption column, 10, is a vertical tank which is filled with helices of glass or porcelain, 12. 14 and 16 are coils which can be used for cooling or heating the solvent or gas phases. The mixture of gases to be separated is fed into the column at 18. An inert gas, such as helium, argon, nitrogen, etc. may optionally be fed into the column at 20. If an inert gas sweep is used, the rate of separation is improved and the efficiency of separation is increased. The unabsorbed gases pass through exit tube 22. The solvent containing the preferentially absorbed gas passes through exit tube 24, through liquid seal 26 to reboiler 28. The mixture of absorbed gas and solvent vapor from reboiler 28 passes upward through pipe 30 to reboiler 32. The mixture of absorbed gas and solvent vapor passes upward through exit pipe 34 to condenser 36. An inert gas such as helium, argon or nitrogen may optionally be passed into the condenser through inlet 38 and the gas which was absorbed in the solvent and inert gas, if used, passes through exit 40 to storage or use. The condensed solvent from condenser 36 is returned to reboiler 32 by pipe 34. The solvent overflows from reboiler 32 through pipe 42, through liquid seal 44 into the absorption column, 10, and trickles downward over the helices in the column.

Thus, if a reaction mixture containing $N_2F_4$, $NF_3$, $CF_4$, and $C_2F_6$ is fed into the column at inlet 18 and $CHCl_3$ is employed as solvent, the $N_2F_4$ is preferentially absorbed by the $CHCl_3$ and the gaseous effluent from exit pipe 40 contains a much higher $N_2F_4$ content than the feed. Thus, in one experiment, with a feed gas containing 70% $N_2F_4$, the effluent from exit tube 40 contained 88.5% $N_2F_4$. By repeated cycling, substantially pure $N_2F_4$ can be obtained.

If the feed is a mixture of $NF_3$ and $CF_4$ and methanol is used as solvent, $NF_3$ is preferentially absorbed by the methanol and the effluent gas from exit tube 40 contains a much higher proportion of $NF_3$ than does the feed gas. In one such experiment, the feed gas contained 76% $NF_3$ and 24% $CF_4$. The effluent from exit tube 40 contained 95.4% $NF_3$, the balance being $CF_4$.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

The following examples, with the exception of Example V, were conducted using a 3 foot long column, 18 mm. inside diameter, packed with glass helices. In Example V, a bubble plate column, 30 inches in length, with an inside diameter of 25 mm., and containing 20 plates, was used. In all cases, the column "NF" refers to the composition of the gas recovered from the solvent. The column "CF" refers to the composition of the gas which is the effluent from the top of the column.

*Example I*

A $CF_4$-$NF_3$ mixture used at 9.8 cc./min. gas with liquid $CH_3OH$ feed at about 5 cc./min. The column top was 25° C. and the column heater voltage at 14 v. (temperature at column foot about 45° C.).

|  | feed | "NF" | "CF" |
|---|---|---|---|
| $CF_4$ percent | 23 | 4.8 | 30 |
| $NF_3$ do | 76 | 95.1 | 69 |
| rel. vol | 1 | .3 | .7 |

*Example II*

A second trial with a gas feed rate of 14.2 cc./min. with the same methanol feed rate was run using a column heater voltage of 18 v. (column foot about 50° C.).

|  | feed | "NF" | "CF" |
|---|---|---|---|
| $CF_4$ percent | 23 | 3.6 | 29 |
| $NF_3$ do | 76 | 95.4 | 71 |
| rel. vol | 1 | .3 | .7 |

*Example III*

A run performed with chloroform solvent at 8 cc./min. with heater voltage at 10 v. (foot of column 40° C.). Gas flow rate was 13 cc./min.

|  | feed | "NF" | "CF" |
|---|---|---|---|
| $N_2F_4$ percent | 73 | 83 | 15 |
| $C_2F_6$ do | 19 | 13 | 30 |
| $NF_3$ do | 2 |  | 18 |
| $CF_4$ do | 2 |  | 20 |
| $N_2O$ do | 2 | 3 |  |
| NO do | 2 |  | 15 |
| rel. vol | 1 | 0.85 | 0.15 |

*Example IV*

A similar run done in chloroform solvent at 8 cc./min. with heater at 20 v. (foot of column at about 50° C.) and gas flow 8.1 cc./min.

|  | feed | "NF" | "CF" |
|---|---|---|---|
| $N_2F_4$ percent | 76 | 90 | 54 |
| $C_2F_6$ do | 17 | 10 | 42 |
| $NF_3$ do | 1 |  | 2.5 |
| $CF_4$ do | 1 |  | 2 |
| $N_2O$ do | 2 | 2 |  |
| rel. vol | 1 | 0.70 | 0.22 |

*Example V*

The following is an experiment done on the bubble plate column with ethylene di-chloride. Liquid flow was 10 cc./min., gas flow was 9.9 cc./min. and column heater was 25 v. (about 55° C. at column bottom).

|  | feed | "NF" | "CF" |
|---|---|---|---|
| $N_2F_4$ percent | 79 | 90 | 65 |
| $C_2F_6$ do | 17.5 | 4.8 | 33 |
| $N_2O$ do | 2.5 | 4.6 |  |
| rel. vol | 1.0 | .55 | .45 |

*Example VI*

A run done with $N_2F_4$-$C_2F_6$ and $HCCl_3$ solvent at 8 cc./min. (gas flow 8.7 cc./min. and column foot about 45° C.) gave:

|  | feed | "NF" | "CF" |
|---|---|---|---|
| $N_2F_4$ percent | 70 | 88.5 | 13.5 |
| $C_2F_6$ do | 23 | 5.2 | 49 |
| $NF_3$ do | 3 |  | 16.6 |
| $CF_4$ do | 3 |  | 15 |
| $N_2O$ do | 2 | 2.5 | 1.5 |
| NO do |  |  | 4.3 |
| rel. vol | 1.0 | 0.7 | 0.1 |

I claim:
1. A process for the separation of tetrafluorohydrazine from a mixture of tetrafluorohydrazine, nitrogen trifluoride, carbon tetrafluoride and hexafluoroethane which comprises passing the mixture into a column at an intermediate point thereof, passing downwardly through the column a solvent selected from the group consisting of chloroform, methanol, dichloroethane, cyclohexane, benzene and monochlorobenzene in quantities sufficient to dissolve the tetrafluorohydrazine but insufficient to dissolve the nitrogen trifluoride, carbon tetrafluoride and hexafluoroethane, removing the solvent containing the dissolved tetrafluorohydrazine from the column and recovering the tetrafluorohydrazine from said solvent.

2. A process as set forth in claim 1 in which an inert gas selected from the group consisting of helium, argon, and nitrogen is passed upwardly through the column from the bottom of the column.

3. A process as set forth in claim 1 in which the top of the column is maintained at a temperature of from about 15° C. to about 30° C. and the temperature of the column is gradually increased in a downwards direction to the bottom of said column which is maintained at a temperature of from about 40° C. to about 60° C.

4. A process as set forth in claim 3 in which an inert gas selected from the group consisting of helium, argon and nitrogen is passed upwardly through the column from the bottom of the column.

5. A process for the separation of nitrogen trifluoride from a mixture of nitrogen trifluoride and carbon tetrafluoride which comprises passing the mixture into a column at an intermediate point thereof, passing a solvent selected from the group consisting of chloroform, methanol, dichloroethane, cyclohexane, benzene and monochlorobenzene downwardly through the column in quantities sufficient to dissolve the nitrogen trifluoride but insufficient to dissolve the carbon tetrafluoride, removing the solvent containing the dissolved nitrogen trifluoride from the column and recovering the nitrogen trifluoride from said solvent.

6. A process as set forth in claim 5 in which an inert gas selected from the group consisting of helium, argon and nitrogen is passed upwardly through the column from the bottom of the column.

7. A process as set forth in claim 5 in which the top of the column is maintained at a temperature of about 25° C. and the temperature of the column is gradually increased in a downward direction to the bottom of said column which is maintained at a temperature of about 50° C.

8. A process as set forth in claim 7 in which an inert gas selected from the group consisting of helium, argon and nitrogen is passed upwardly through the column from the bottom of the column.

References Cited in the file of this patent
UNITED STATES PATENTS
2,865,714    Robell et al. _____ Dec. 23, 1958